UNITED STATES PATENT OFFICE.

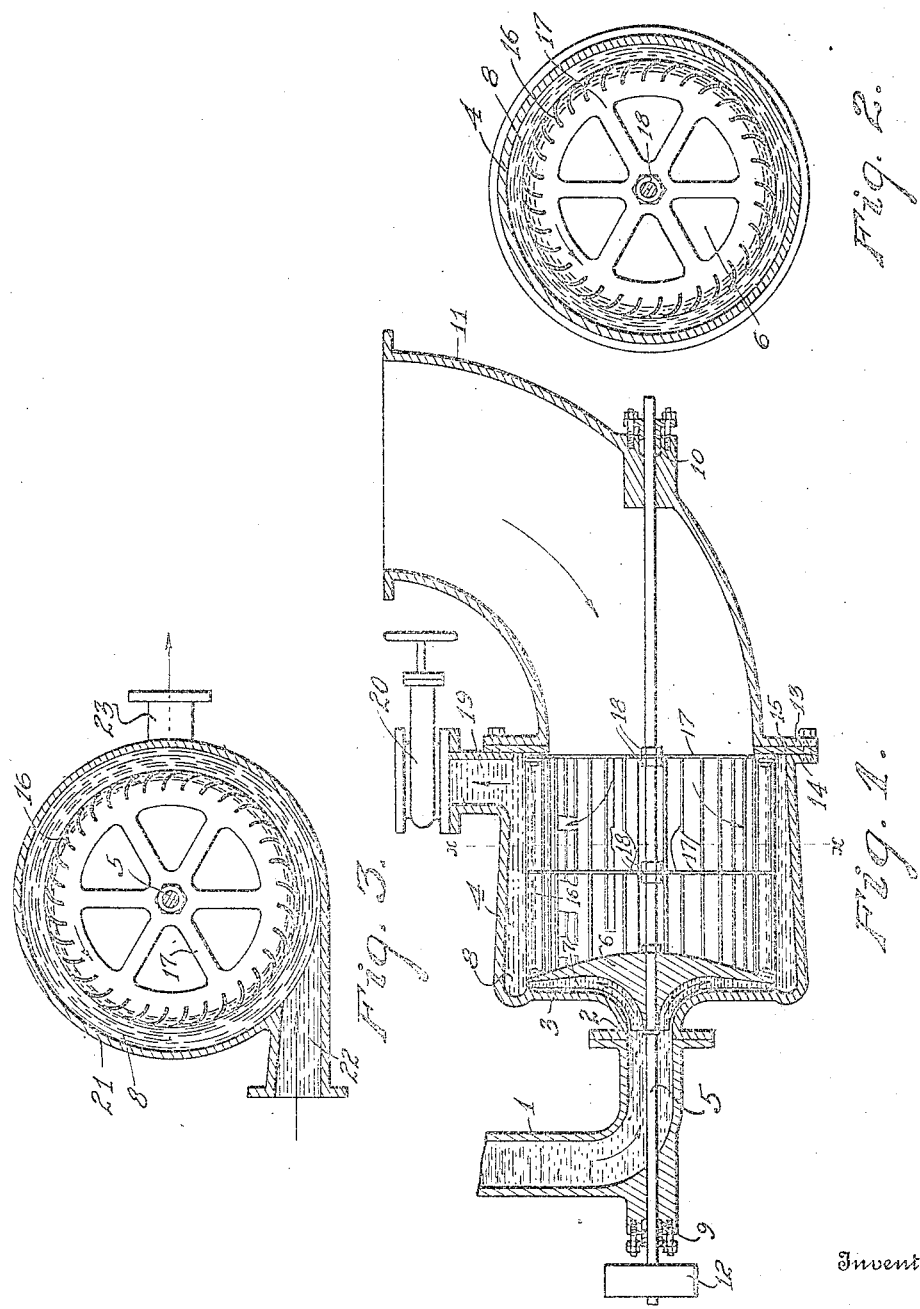

GEORGE B. BASKERVILL, JR., OF BIRMINGHAM, ALABAMA.

ROTARY CONDENSER OR ABSORBER.

1,110,035. Specification of Letters Patent. Patented Sept. 8, 1914.

Application filed August 22, 1913. Serial No. 786,200.

*To all whom it may concern:*

Be it known that I, GEORGE B. BASKERVILL, Jr., a citizen of the United States of America, residing at Birmingham, in the county of Jefferson and State of Alabama, have invented certain new and useful Improvements in Rotary Condensers or Absorbers, of which the following is a specification.

My invention relates to a rotary condenser or absorber which is adapted by means of a rotor to maintain about the walls of a chamber a whirling mass of constantly changing liquid and into the space surrounded by this mass of liquid I can either introduce a gas or vapor to be condensed or absorbed by the liquid or I can draw off, by suction, air, gas or vapor from the whirling mass of liquid.

The object of my invention is to positively maintain the central gas chamber free of its encircling mass of liquid by employing centrifugal force induced by the rotating element through which the gas or vapor has free access to unite with or be drawn off from the liquid.

A further object of my invention is to provide means for uniting a gas of low pressure with a constantly changing fluid under higher pressure and without changing the pressure of the fluid. The rotor can be designed and driven at a speed calculated to maintain the flowing body of liquid at any desired pressure while it is exposed to the gas of lower pressure. The centrifugal action of the rotor on the fluid will produce a whirling mass of fluid under pressure surrounding the central gas space but prevented by centrifugal force from encroaching on such space.

My invention further comprises the details of construction and arrangements of parts hereinafter more particularly described and claimed by reference to the accompanying drawings which present illustrative embodiments of my invention, and in which:—

Figure 1 is a vertical longitudinal section through a condenser or absorber provided with a centrifugal pump which delivers the fluid to the diffusion chamber where it is acted upon by the rotating diffusion elements. Fig. 2 is a vertical transverse section on the line *x—x* of Fig. 1. Fig. 3 illustrates a simplified embodiment of my invention in which the pump is omitted and the fluid delivered tangentially into the diffusion chamber and in the direction of rotation of the rotating diffusion element.

Similar reference numerals refer to similar parts throughout the drawings.

It being evident that my invention is susceptible of a wide variation in construction without departure from the principles of operation involved, I have illustrated several simple embodiments of my invention operating as a condenser. In Fig. 1, the fluid is delivered through pipe 1 into a central opening 2 in the head 3 of the circular condensing or absorbing chamber 4. The port 2 flares gradually and I mount upon a rotating shaft 5 a rotary pump 6 which makes a close running fit in such port and has ports 7 therethrough which open in line with the entering liquid and curved radially so as to deliver the liquid in an annular whirling mass to the peripheral space 8 surrounding the inner wall of the chamber and in which it is maintained by rotating means. A shaft 5 passes through a stuffing box 9 on pipe 1 and continues axially through the center of chamber 4 and through a stuffing box 10 on the vapor or gas inlet pipe 11. A pulley 12 driven by any suitable source of power is adapted to give the shaft 5 the speed of rotation desired. The gas inlet pipe 11 is flanged at 13 and bolted to a flange 14 at the discharge end of the chamber 4, an annular ring plate 15 being interposed between the flanges.

A rotor is driven by the shaft and designed to maintain the liquid in the annular space 8 as it flows with a spiral whirl to the point of discharge. Any rotor means for producing this effect may be used provided it affords by-openings or spaces therein for the free access of the gas to the liquid. The rotor construction illustrated comprises a series of closely associated curved vanes 16 which at one end are flanged and bolted to the peripheral edge of the inner face of the pump and which are supported at other points by spiders 17 mounted on the shaft 5 and held thereon between pairs of nuts 18 which are screwed onto the shaft. The spiders, as seen in Fig. 2, permit the free interchange of air, vapor or gas between the chamber or space surrounded by the rotating vanes and the body of liquid driven thereby. The vanes are curved outwardly in a reverse direction to their line of rotation and are preferably disposed with their outer edges standing substantially parallel with the shaft 5 and in line with the peripheral edge of the rotor. The center spider has its periphery notched to receive and brace the vanes which at their outer ends are flanged and bolted to the inner side of the outer spider. The diameter of the chamber 4 may be made to decrease slightly toward its discharge end from which the port 19 leads to a valve casing 20 which controls the outflow of liquid from the casing. The ring 15 or flange of the pipe 11 tends to confine the liquid into the annular space 8 in the casing proper, though if the liquid overflows into pipe 11 it gravitates back into the casing and is caught up by the rotor and forced out. I prefer to have the chamber 4 contracted toward the discharge as I thereby contract the annular liquid space at its outlet end which has a tendency to retard the flow of the colder fluid in the mass to the discharge.

In operation as a condenser, the incoming liquid is caught by the pump 6 and thrown outwardly into the space 8, its pressure being maintained or modified by the speed of the pump. Having arrived in such space, the fluid is acted upon by the rotor vanes 16 which sweep it along with them and force it by centrifugal action against the inner wall of the chamber so that the fluid travels spirally lengthwise of the casing 4 toward the outlet 19. The gas or vapor admitted through pipe 11 passes between the spiders and occupies the gas chamber or space at the center of the chamber 4 where it is surrounded by the whirling tubiform body of liquid to which it has access between the vanes of the rotor. In the case of a condenser, the steam is condensed where it contacts with the liquid and the water of condensation is carried off with the whirling mass of water through the outlet port 19. In the case of an absorber, the ammonia gas or like gas is absorbed by the circulating mass of weak liquor under pressure and passes off with it, it being noted that there is no need for a drop in the pressure of the liquor if the operating conditions require that such pressure be maintained. In the case of a means for extracting air, or gas from the liquid, a vacuum is created in pipe 11 by any suitable means.

In Fig. 3 I have illustrated a simpler embodiment of my invention where the fluid is delivered into the casing 21, which is similar to 4, through a tangentially disposed inlet port 22, the whirling mass of water thus delivered in the space 8 being immediately acted upon by the rotating vanes 16 in the manner already described as it passes lengthwise of the casing to the outlet port or ports 23, it being immaterial whether the tangential inlet port is disposed at the center of the casing and the fluid caused to flow in opposite directions to outlet ports 23, or whether it is arranged at one end of the casing and the fluid discharged at the other end thereof, as shown in Fig. 1. When the fluid inlet port is disposed midway of the casing, the diameter of the diffusion chamber is maintained substantially constant.

I wish it understood that other rotating centrifugal means can be employed provided they are effective to maintain the liquid out of the air or gas chamber and do not interfere with the free commingling of the gas and fluid nor with the effective withdrawal of air, gas or vapor from the liquid by suction through pipe 11.

Without limiting myself to the specific construction shown in the drawings which are merely illustrative, what I claim as new and desire to secure by Letters Patent, is—

1. In an apparatus of the character described, a chamber, means to deliver a flowing stream of liquid tangentially to the inner peripheral wall of said chamber which has a liquid outlet, a rotating vane bearing element which forces the flowing liquid by centrifugal force against the chamber wall to form a space therein surrounded by and exposed to a whirling mass of constantly changing liquid under pressure, and a pipe for conducting vapor or gas which opens into said space, substantially as described.

2. In an apparatus of the character described, a stationary chamber having liquid inlet and outlet ports, rotating vanes therein between said ports which travel close to the chamber wall and act on the body of liquid flowing therethrough to concentrate it by centrifugal force against the inner chamber wall to form and maintain a hollow whirling mass of continuously flowing fluid under pressure, and a gas conducting pipe which opens into the space at the center of said whirling mass, as and for the purposes described.

3. In an apparatus of the character described, a stationary cylindrical chamber having fluid inlet and outlet ports at opposite ends and a gas inlet port disposed centrally of one end, and a rotor concentric with and rotatable within said chamber and which carries a series of narrow closely spaced vanes which act on the fluid passing through the chamber to hold it by centrifugal force against the chamber wall, said gas inlet port being arranged to deliver the gas into the center of the fluid lined chamber, said fluid being adapted to seal the first mentioned ports, as and for the purposes described.

4. In an apparatus of the character described, an elongated cylindrical chamber having inlet and outlet ports for liquid which flows lengthwise therethrough, a concentric rotating element in said chamber adapted to rotate in juxtaposition to its inner wall and in contact with the liquid therein to cause it to travel spirally along the cylinder, said element extending lengthwise of the cylinder between said ports and being designed to permit free access of the gas to the liquid, and a gas conducting pipe which opens into the central space in the chamber surrounded by said rotating element and the body of the liquid acted on thereby, substantially as described.

5. In a means for uniting a liquid under pressure with a gas under less pressure, a cylindrical chamber, means to supply liquid to the peripheral wall of said chamber, centrifugal means which act on and maintain said liquid under pressure while it is flowing through said chamber, said centrifugal means acting to force the liquid away from the center of the chamber to form a space, and pipe means for conducting gas having a lower pressure than the liquid which opens into such space, said centrifugal means having spaced openings therein which permit the gas and liquid to unite, substantially as described.

6. In an apparatus of the character described, a chamber having liquid inlet and outlet ports and adapted to contain a mass of liquid, rotating vanes to give the liquid in said chamber a whirling motion and concentrate it under pressure about the periphery of the chamber to form an open space therein surrounded by and exposed to the whirling mass of liquid under pressure which seals said liquid inlet and outlet ports, and an exhaust pipe communicating with said open space and adapted to draw off air, gas or vapor from the encircling mass of liquid, substantially as described.

In testimony whereof I affix my signature in presence of two witnesses.

GEORGE B. BASKERVILL, Jr.

Witnesses:
 NOMIE WELSH,
 WM. C. PRICKETT.